United States Patent [19]

Messer et al.

[11] 3,980,865

[45] Sept. 14, 1976

[54] ELECTRONIC INTEGRATOR FOR GAS VOLUME CALCULATIONS

[75] Inventors: Elmer S. Messer; Donald K. Mitchell, both of Tulsa, Okla.

[73] Assignee: Flow Measurement Company, Inc., Tulsa, Okla.

[22] Filed: June 2, 1975

[21] Appl. No.: 582,611

[52] U.S. Cl. .................... 235/61.6 A; 235/151.34
[51] Int. Cl.[2] ................... G06K 15/00; G06F 15/56
[58] Field of Search .................. 235/61.6 A, 61.6 B, 235/150.51, 151.34; 318/567, 575

[56] References Cited
UNITED STATES PATENTS

| | | | |
|---|---|---|---|
| 3,171,951 | 3/1965 | Christopher | 235/61.6 A |
| 3,296,420 | 1/1967 | Searcy et al. | 235/61.6 A |
| 3,327,097 | 6/1967 | Searcy et al. | 235/61.6 A |

Primary Examiner—Daryl W. Cook
Attorney, Agent, or Firm—Head, Johnson & Chafin

[57] ABSTRACT

A mechanical and electronic apparatus for integrating gas flow charts for determining gas volume. The mechanical apparatus includes a motor driven disc on which a recorded flow chart can be placed, with suitable pen arms, and operating arms, so that an operator can simultaneously vary the angular position of each of two pens, so that the pens may trace or scan simultaneously, the two recorded traces of pressure and differential pressure, as the disc and chart rotate under a motor drive. Optical encoders convert the rotation of the disc and the angles of swing of the pen arms to digital values. The outputs of the encoders are scaled to the particular charts and chart arms. The result of the scaled pulses go to an up/down counter for interpretation of total angle of each of the pen arms. The digital numbers representing the angles of the two pen arms then have their square roots extracted, the two outputs of square roots of pressure (P & A) and differential pressure H go to a multiplier and an accumulator. The output then goes to a display register, or to a printer.

8 Claims, 6 Drawing Figures

ELECTRONIC INTEGRATOR FOR GAS VOLUME CALCULATIONS

BACKGROUND OF THE INVENTION

This invention lies in the field of gas flow measurement. More particularly, it lies in the field of electronic integration of gas flow rate to provide total flow during a selected period. Still more particularly, it involves a mechanism for manually transcribing the traces of pressure and differential pressure on circular flow charts, and by proper encoding of the rotation of the chart table and of the two angular motions of the two pen arms, provides a running integral of the flow.

In many industries, such as the chemical and petroleum industries, large volumes of gas flow must be metered for various reasons, but mainly because of the fact that gas is valuable, and is bought and sold, and gas flow must be determined precisely so that the proper payments can be determined and made.

For over 50 years the conventional method of measuring gas flow was by means of a circular chart flow recorder, which determined the gauge pressure of the gas and the differential pressure across an orifice plate inserted into the flow line. Dependent on the size and shape of the orifice the flow rate is determined by the product of a constant C which is the calibration constant of the orifice, times the magnitude of square root of absolute pressure times the square root of differential pressure.

In the prior art there have been many different types of mechanical integrators, using wheel and disc type multipliers and various types of cams for determining square roots, etc.

Each of these mechanical systems utilizes the measurement of angle of two pen arms, one which is manually operated to follow the trace of pressure on the flow chart placed on a rotating table, and the other is manually operated to follow the trace of differential pressure. An operator has two rotatable operating arms which are linked to the two pen arms, and by operating each of the operating arms by one hand, he simultaneously tracks both of the traces with the two pen arms.

For many years the mechanical integrators have used the angles of rotation of the two operating arms and the rotation of the table to provide a continuing product, which represents the instantaneous flow rate, and by integrating flow rate with time, or rotation of the chart, the flow during the selected time interval is provided.

SUMMARY OF THE INVENTION

It is a primary object of this invention to provide an electronic integrator that can be used in conjunction with the mechanical apparatus for transcribing circular chart records, of instantaneous pressure and differential pressure, as a function of angle of rotation of the chart, or as a function of time.

It is a further object of this invention to display a continuing integration of the square root of absolute pressure times the square root of differential pressure.

These and other objects are realized and the limitations of the prior art are overcome in this invention by driving the chart plate with a motor having adequate speed control, and at the same time synchronously rotating a disc having a series of radial slots, inserted between a source of light and a photoelectric detector, so that pulses of current or voltage are provided at equal angular increments of rotation of the table, for example, 1/1000th of a complete rotation.

Additionally, optical incremental encoder means are provided on separate shafts each driven by one of the operating arms, which are used by the operator to control the angle of the pen arms. The angular ratio of drive between the operating arm shafts and the encoder shafts, and between the operating arm shafts and the pen arm shafts, are such that the encoder provides a fixed number of units of angles in the travel of the pen arms from the zero position on the chart to the full scale position. In particular, the encoders provide a selected number of units of angle, for example, 5000, between these two limiting positions of the pen arms.

Utilizing the rotations of the incremental encoders, means are provided to integrate the angle of rotation of the pen arms, accounting for both increasing and decreasing angles of rotation, so that the instantaneous angles of the pen arms above the zero line are known at each instant of rotation of the disc. The pulse trains from the encoders are adjusted scale wise, so as to represent for each unit a fixed proportion of the total scale range of the chart.

The pulses from the encoders corresponding to the current angles of each of the pen arms, then go to up/down counters where the integrated angles of rotation of the pen arms are determined.

In the case of the pressure pen, an additional count corresponding to the value of atmospheric pressure is added in order to provide an output which corresponds to the absolute pressure of the gas in the line, rather than the recorded gauge pressure.

Having the two numbers representing the two angles of the pen arms and representative of the absolute pressure and the differential pressure, electronic means are provided for extracting the square roots of these two numbers, which then are carried to a multiplier which gives the product of the square root of (P & A) and the square root of H. This product gives the value of gas flow during the short interval of 1/1000th of the rotation of the chart. This binary number corresponding to that flow goes to a register, or accumulator, or counter, so that the total count representing the total flow through 1000 units of angle can be determined.

The output of the multiplier and accumulator represents the desired answer of the electronic integrator. However, in order to put it into useful form such as for a display, etc. the number in binary form is converted to binary-coded-decimal form, and is then adapted to be displayed in terms of a decimal register and can be displayed, showing the continued integration of the flow.

At any desired interval, the output of the multiplier and the accumulator can then be recorded by means of a printer or any other form of recording. A printout on paper tape is often a desired type of record for the calculations made on the circular chart record.

Having the instantaneous value of pressure represented by a binary number, this quantity can be separately accumulated, and, therefore, at the end of the complete rotation of the chart will represent the integrated value of pressure at each of the thousandths of angular positions of the chart. Dividing this number by 1000 will then give the average pressure throughout the period corresponding to the rotation of the chart, which normally is determined to be 24 hours, although a shorter or longer period can be provided. Similarly, a counter controlled by the rotating slotted disc which runs from the chart disc drive, when counted, will vary from zero at the start of the records to a maximum of 1000 when the complete revolution has taken place. This sum can be displayed continuously if desired to indicate what fraction of the chart has been integrated.

If it is desired to provide an analog trace showing the instantaneous flow rate or the instantaneous integral of flow rate this can also be provided by taking the appropriate digital values converting them to analog values and recording them as analog traces.

Since there are a number of manufacturers who produce the gas flow recorders, which in operation produce the circular charts, which are the basis for calculation of gas flow, a calculating machine of the type of this invention, which transcribes the circular charts, and continuously calculates flow and integrated flow, etc. must be adapted to use circular charts produced on any one of the manufacturers' instruments. Since there is no concensus as to the optimum method of mounting the pen arms, and the lengths of the arms, and the chart range of the traces, etc. the instrument that is used in practice to transcribe and calculate the flow from these charts must be adapted to utilize a variety of pens, and positions of pen axes, etc. and corresponding ratios of rotation between the operating arms and the pen arms so that the total flow in the same units will be provided on charts supplied with any make of recorder with the same precision required.

BRIEF DESCRIPTION OF THE DRAWINGS

These and other objects and advantages of this invention and a better understanding of the principles and details of the invention will be evident from the following description taken in conjunction with the appended drawings in which.

DESCRIPTION OF THE PREFERRED EMBODIMENT

Figure 1:
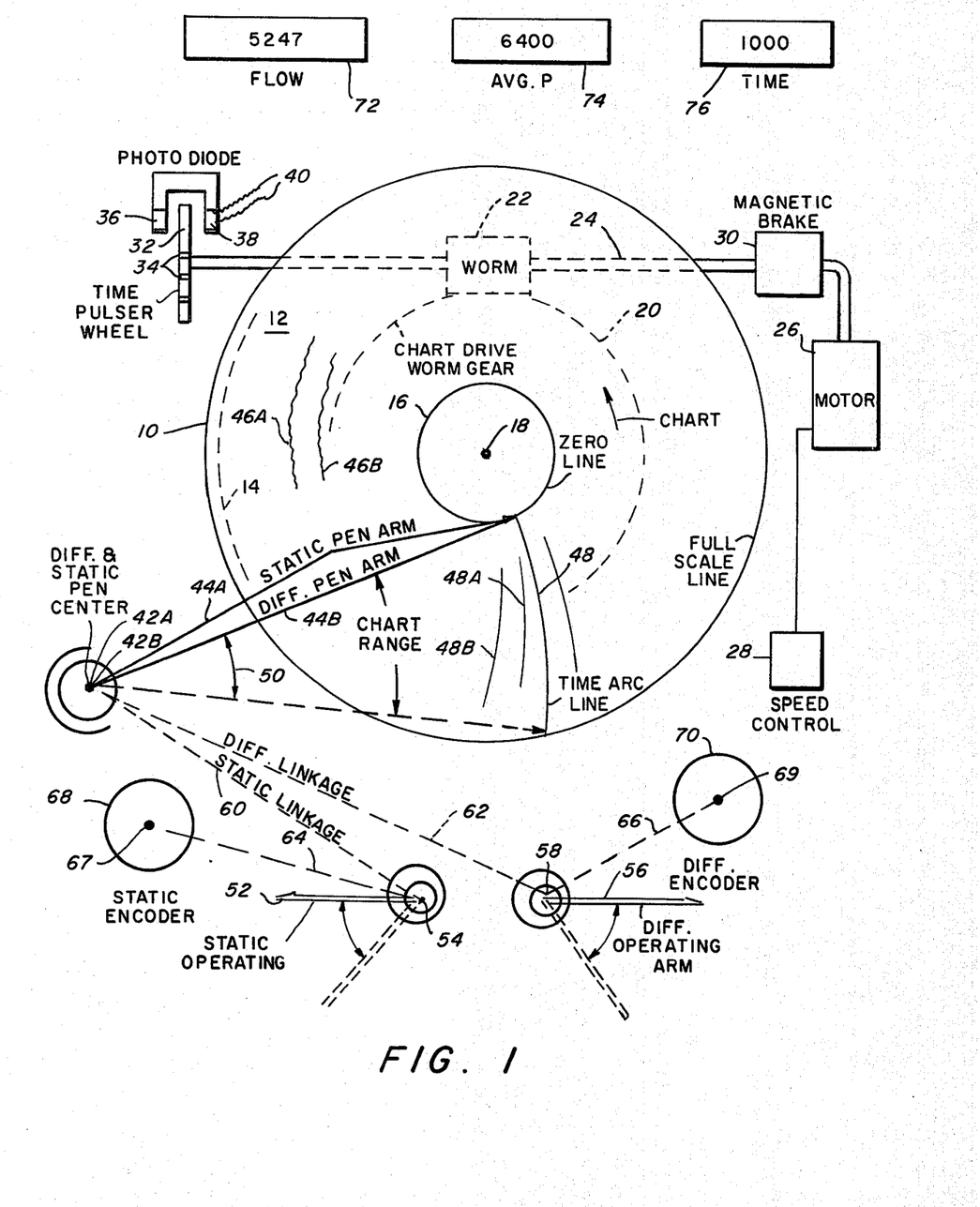
FIG. 1 represents in schematic form the general apparatus involved in the transcription process of the circular charts.

Referring now to the drawings and in particular to FIG. 1, there is shown in schematic form the mechanical portions of the apparatus of this invention. There is a circular disc 10 having an axis 18 and appropriate bearings (not shown). On this disc a circular chart 12, which represents a paper or cardboard circle with means to center the chart on the axis 18. On this chart there are two traces partially indicated as 46A and 46B. These traces were originally drawn by ink pens on the chart, when positioned in a gas flow recorder adapted to use circular charts. There are two circles marked on the chart, and appropriate circles in between, (not shown). The inner circle 16 represents the minimum position of the recording pens or the zero value of the quantities represented by the traces. The outer circle 14 represents the full scale range of the record, in other words, going from 16 to 14 the pen would traverse values zero to full scale of the variables, which are static pressure P and differential pressure H. For convenience, call the trace of static pressure 46A and the trace of differential pressure 46B.

The purpose of this device is to transcribe the two traces 46A and 46B as the chart rotates. The traces are tracked or scanned by two pens, or points, which are mounted on two arms called the static pen arm and the differential pen arm. These arms are pivoted coaxially at point 42A and 42B. Since they are coaxial, the two arrows represent two pen shafts, one journalled inside the other.

The chart disc, or simply disc 10, is journalled in bearings about its axis 18 and is generally in a horizontal plane. A drive means, for example, a worm wheel shown dotted by the numeral 20, is driven by a worm gear 22, which is mounted on a shaft 24 driven by motor 26 through a magnetic brake 30. The motor has a speed control 28 available to the operator so that he can adjust the speed of the motor to such a speed so that he can faithfully follow, or track, these two traces 46A and 46B with the two pens 44A and 44B, respectively, while controlling the angle of the pens independently, by two operating arms 52 and 56, one operated by his left hand and the other by his right hand. If there is considerable radial variation of the traces, 46A and 46B, then the motor generally is reduced in speed, so that the disc rotates at a slower speed, so that the operator can more faithfully follow the wide swinging variations of the traces.

The angle of rotation of the disc 10 is converted to pulses by means of a slotted disc or pulser wheel 32 having radial slots 34. This disc is mounted on an extension of the shaft 24. The disc is inserted as a rotating mask between a source of light 36 and a photoelectric pickup 38, having output connections 40. As each slot in the disc 32 passes between the light, and the light detector, 38 a pulse of light will pass through and will be converted to a pulse of voltage or current depending on the type of detector.

The two operating arms 52 for the static pen and 56 for the differential pen, are journalled in bearings about axes 54 and 58, respectively. There is a drive linkage indicative by the dashed lines 60 and 62, which may be in the form of gears and shafts, or preferably in the form of a fine wire cable wrapped around pulleys, so that the pen arms will operate in synchronism with the operating arms, without any play or backlash.

There are also a pair of linkages represented by the dashed lines 64 and 66, respectively, between the static arm shaft 54 and the static encoder 68, and also between the differential operating arm 56 and the differential encoder 70. The linkages 64 and 66 may be of any type but are preferably of the type of a thin wire a strip belt between two pulleys, as is well-known in the art.

Also shown in FIG. 1 are three decimal display windows indicating respectively 72, the flow value, that is, the instantaneous integral of the chart up to the present position of the chart; display 74, which represents the pressure averaged throughout the rotation of the chart; display 76, which represents the total count of pulses from the detector 38, which presents the total angle of sweep of the disc 10 up to the present time. The display of these values is optional. However, the electronic apparatus provides these values currently and therefore may be displayed for their values in the operation of the device.

One of the important advances in the integrator is the design of the optical encoders indicated by numerals 68 and 70 in FIG. 1.

Figure 2A:
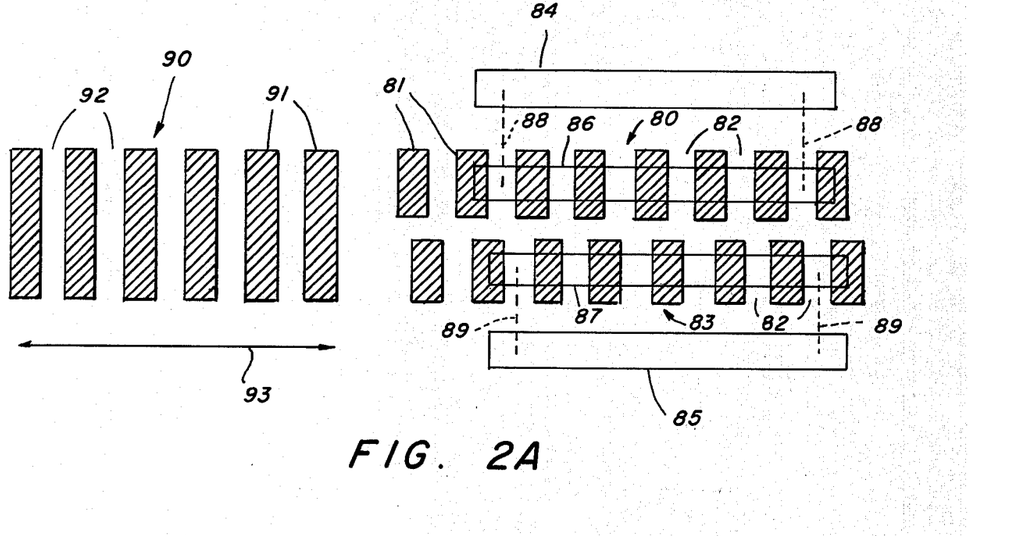
FIGS. 2A and 2B indicate the principles of operation of the optical encoder, by means of which the angle of rotation of the pen arms is converted to pulses, which, with appropriate counters, etc. provide a measure of the instantaneous angles of the pen arms.
Figure 2B:
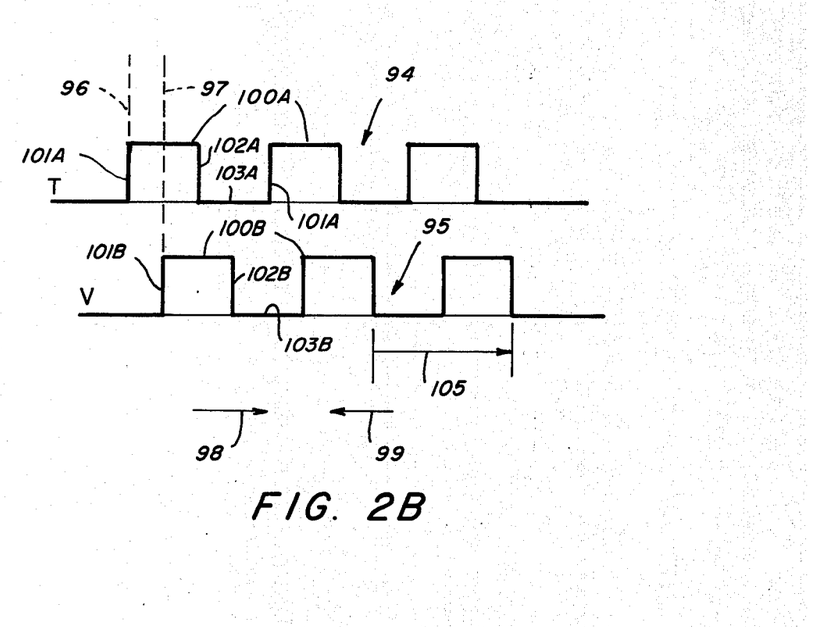

In FIGS. 2A and 2B are shown the principles of operation of the encoders. What is required is more than simply a series of pulses which represent angle, such as would be provided by the disc 32 of FIG. 1. What is required here are a series of pulses which occur as movement in a first direction occurs, and a second set of pulses which represent movement in the reverse direction, plus some means of operating a counter to count up when the first series of pulses are effective and to count down when the second series of pulses are effective.

This is accomplished by having an encoder which comprises three sets of gratings illustrated in FIG. 2A. A grating is composed of finely spaced transparent and opaque lines or bars. One of the gratings indicated by numeral 80 consists of the short bars or lines 81, of a selected width which are spaced from each other by equal spaces 82. The widths of the spaces and of the bars are equal.

There is a second grating composed of a set of bars and spaces indicated generally by the numeral 83. These have the same width of bars 81 and of spaces 82. There are two long rectangular apertures, one 86, positioned across a selected group of lines and spaced in the first grating 80. A suitable light source and photoelectric sensor 84 are provided so that change in the light beam 88 through that aperture 86 will result in a change in the electrical signal generated. There is a corresponding aperture 87 opposite a group of lines and spaces in the second grating 83 and an appropriate light source and photosensor 85. The beam 89 passes through the aperture 87.

There is a third grating indicated by the numeral 90 which shows bars 91 of the same width as the bars 81 and spaces 92 of the same width as spaces 82. The lengths of the bars 91 are such that they are as long as the total extent of the two gratings 80 and 83. The grating 90 is actually in the form of a circle, and there are approximately 5000 bars and 5000 spaces in the circle, of which the few bars shown are simply a part of the arc of the circle. They are shown for convenience in a straight line to illustrate the principle.

The arrow 93 indicates that the movable, or circular, grating 90, is on a disc, which is rotated about an axis, 67 for example, or 69, of FIG. 1, depending on which of the two encoders is being considered. Therefore, as the arm 52 rotates, the disc 68, on which the grating 90 is mounted, will also rotate, and the grating 90 will then move in the direction of the arrow 93 forward or backward, above the two fixed gratings 80 and 83. They are in separate planes, which are closely spaced, and the light beam 88 penetrates through the grating 90 and through the grating 80. In the second aperture 87 the light beam 89 passes through the grating 90 and the grating 83.

It will be clear that when the bars 91 in their movement across the gratings 80 and 83 are positioned precisely over the transparent spaces 82, between the opaque bars 81, no light will pass through the aperture 86. Then, as the grating 90 moves to one side or the other, less than the full space 82 will be covered, and some light will pass through the aperture. Therefore, the amount of light that passes through the aperture will vary from a maximum, when the spaces are fully uncovered, to a value of zero, when the spaces are completely covered. The output of the photosensors will thus vary in a more or less sawtooth fashion.

The sawtooth signals provided by the photosensors 84 and 85 are converted into a series of square wave pulses shown in FIG. 2B, in the pulse shaper and the coding logic box 114. This conversion is conventional and the apparatus can be purchased off the shelf as is well-known by the man skilled in the art.

After passing through the pulse shaper, the signal appearing on leads 116A and 116B would look like the two traces in FIG. 2B. One trace T shows a rise 101A at a time indicated by the dashed line 96. It then reaches a maximum value represented by numeral 100A, and then drops back to the zero line 103A by line 102A, and then continues as zero until the next rise 101A and so on. The second trace labelled V is a similar series of square pulses having a rise 101B at a time indicated by the dashed line 97, reaching a maximum indicated by magnitude 100B, and then falling back along the line 102B to the zero value 103B and etc. Because the width of the spaces and the lines 82 and 81 are equal, the pulses of the curves T and V are of equal width, having a maximum value 100, and a zero value 103 of equal length. The displacement between the two curves 94, 95 is the spacing between the lines 96 and 87, which represents one quarter of a cycle, between corresponding lines 101A or 101B, for example.

Figures 4, 5:
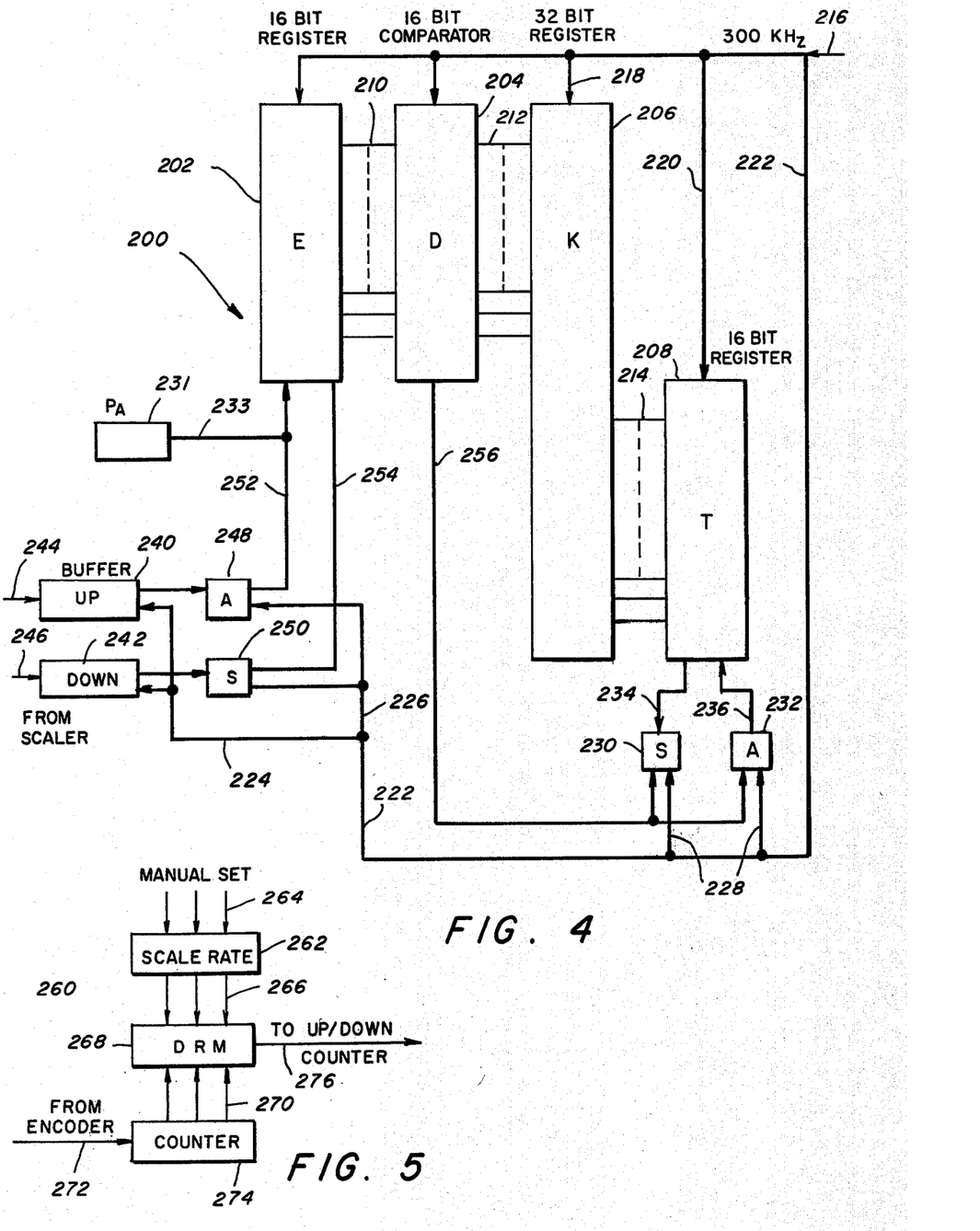
FIG. 4 illustrates details of the UP-DOWN counter and square root extractor.
FIG. 5 illustrates details of the scaling logic.

It will be seen that as the movable grating 90 moves to the right, trace T will rise from zero to a maximum, or logical 1, and then a little time later trace V will rise from zero to a logical 1. Comparing the states of the two lines T and V, consider the four states when V is zero and T rises to 1; when T is 1 and V rises from 0 to 1; when V is 1 and T drops from 1 to 0; when T is 0 and V drops from 1 to 0. Any one of these four states indicates that the grating 90 is moving in the direction of the arrow 98. On the other hand, when the grating is moving in the direction of the arrow 99 the sequence of states is as follows: when V is 0 and T drops from 1 to 0; when T is 0 and V rises from 0 to 1; when V is 1 and T rises from 0 to 1; when T is 1 and V drops from 1 to 0. Any of these four states indicate movement of the grating 90 to the left. Simple gate logic can convert these situations, to put out a pulse on a first line representing an increment of 1 count whenever the first group of four occur, and a corresponding logic to put a pulse out on another line representing a decrement of 1 count whenever the second four situations occur. It is possible therefore to have pulses put out on one or the other of the two lines, the pulses on one line indicating that the count of the encoder is increasing by one and a pulse on the other indicating that the count of the encoder is decreasing by one. It is these pulses on lines 244 and 246 (which will be discussed in connection with FIG. 4), after they have gone through the scaling logic of box 118. These pulses arrive at the buffers 240 and 242 to be used to update the counter 202 of FIG. 4, representing the instantaneous count of the encoder.

Figure 3:
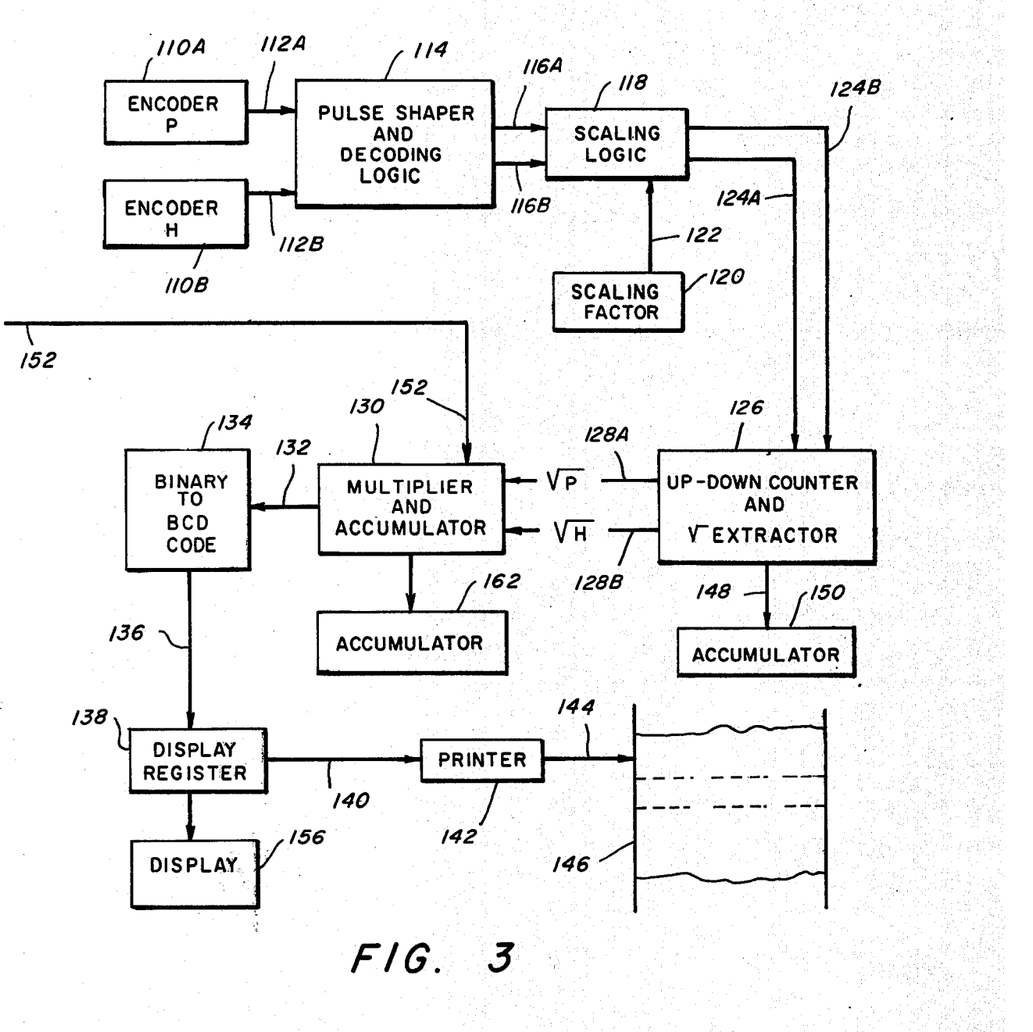
FIG. 3 is a block diagram of the electronics of the system which takes inputs from the encoders for the pressure arm, and the differential pressure arm, and from the angle encoder of the chart disc.

Referring now to FIG. 3, there is shown in block diagram form an outline of the electronic system of this invention. Call the pressure trace P and the differential trace H. There are two encoders 110A and 110B, one identified by the letter P for the pressure or static operating arm, and pen 52 and 44A, and the other identified by the letter H for the encoder connected to the differential operating arm 56 and the differential pen arm 44B. Both of these encoders put out trains of pulses on leads 112A and 112B, respectively, to a unit 114, which is used to shape these pulses into suitable square wave structure, and for decoding the logic of the output pulses from the photosensors. There are two outputs 116A and 116B, which represent the decoded signals from the two encoders 110A and 110B.

One of the important parts of this invention is in the scaling unit which provides a means for effectively correcting for variations in the various factors which are involved in construction of apparatus of this sort. For example, the angle 50 through which the pen turns in going from a zero value to a full scale value, depends upon a number of factors, such as the length of the pen arm and the position of the axis of rotation of the pen arm. Further, there is an operating arm 52 and a drive linkage 60 between the operating arm and the pen arm having a ratio of transmission of angle between the operating arm and the pen arm. There is also a drive between the operating arm and the encoder shaft, and there is a factor of the angular spacing of each of the lines on the encoder grid. All of these are involved together in determining the ratio of the encoder output to the angle of the pen arm.

It would be nice to be able to adjust all of the drive ratios etc. so that one unit on the encoder would represent one unit of pressure. However because of manufacturing difficulties, and because certain parts such as the encoder are made by outside manufacturers, it is preferred to provide a scale changing means in the circuit, by which the digital signals going from the encoder to the up/down counter can be changed. Such a scaling device simplifies the construction of the unit, since minor variations in the ratio of the drives between the operating arm and the encoder, and the operating arm and the pen arm, can change the overall ratio. Consequently, it is convenient to construct the instrument with these ratios adjusted to a nominal value, and then to provide an overall correction factor which can be inserted into a scaling unit, to provide an accurate conversion from pulses produced by the encoder to the required number of pulses to represent a unit of pressure.

Having converted the pressure and differential pressure values to digital values, digital scaling logic can be used, represented by box 118, into which is inserted a digital number representing a scaling factor from box 120 through leads 122, which can be introduced by means of manually operated digital wheels.

This is shown in more detail in FIG. 5, where the pulse signals come from the encoder over lead 272, after the pulses have been shaped into the square shape corresponding to that of FIG. 2. These pulses enter on line 272 and go to a counter 274, which totals the complete number of pulses from the encoder. This counter 274 is an up/down counter, and it can be incremented upward as the pen moves to larger values of pressure, or decremented downward, when the pen arm moves to a lower value of pressure. There is a scale rate box 262 which represents a digital number less than unity, and generally in the range of 0.8000 to 0.9999, which can be set into the box by means of manual controls 264. These are commonly available on the market. There is further a box labelled Digital Rate Multiplier (DRM) 268. This is a device available on the market, which reads the digital number on leads 266 and the digital number on leads 270, and controls the outflow of pulses on lead 276 to the selected fraction of the number represented on leads 270, in accordance with the factor set in by the scale rate box 262 on leads 266.

The digital rate multiplier is a well-known method of multiplying a digital number from counter 274, by a static digital number represented by box 262, and to output a series of pulses on line 276 which represents the product of the number on counter 274 by the factor set into box 262. Such a circuit as indicated in FIG. 5 illustrated and described in the book *Decimal Computation*, by Hermann Schmid, John Witey & Sons, New York, 1974.

In the diagram of FIG. 3, a very important part of the apparatus is the box 126 entitled Up/Down Counter and Square Root Extractor. This box takes the output of the scaling logic 118 which has modified the pulses coming from the pressure and differential pressure pens and encoders. These pulses are to be integrated to provide a measure of the instantaneous pressure and the instantaneous differential pressure. These numbers then are to be operated on to take their square roots, so that the square roots can be multiplied in the box 130 to provide the instantaneous value of fluid flow.

The basis, or the algorithm of the processing to take the square root is the following approximation:

$$\sum_{n=1}^{N} n \cong \frac{N^2}{2}$$

which states that the integral, or summation, of all integers from 1 up to N is equal to $N^2 12$.

Referring now to the diagram of FIG. 4, there are shown a number of digital registers. The 16 bit register E identified by numeral 202 accumulates the pulses from the scaling unit which come in on leads 244 and 246. The pulses representing increases of the encoder number are separated from the pulses representing decreases of the number as are explained in connection with FIG. 2. These go into temporary buffers 240 and 242, respectively, for the up and the down counts, on signal, which comes in on leads 244 and 226. The counts to be added are inserted through the logic 248, which go by lead 252 to the register 202. The counts to be subtracted, from logic 250, go by way of lead 254 from the register 202. The status of the buffers 240 and 242 are maintained current with the movement of the pen. On signal on leads 224 and 226, the particular status of the buffers 240 and 242 are then communicated, to alter the total either up or down in the register 202. Consequently, the number in the register 202 is the instantaneous value of the encoder and represents the pressure, (or differential pressure). There are other sets of elements identical to FIG. 4 which are used for the differential pressure, which operate in the same way, so that discussion of this figure in terms of pressure, will correspond to that of differential pressure, and need not be repeated.

Register 204 labelled D is a 16 bit comparator. It is connected by multiple leads 210 to the register 202 and by multiple leads 212 to the register 206, or register K. Register K is a 32 bit register and has input by means of multiple leads 214, which come from register T or 208. The strobe signal on lead 216 comes from a 300 KHZ oscillator, and causes all of the registers to be updated each time there is a strobe pulse on line 216.

The comparator D looks at the content of the registers E and K, and whenever the register E is greater than register K as represented by the signals on leads 210 and 212, it puts out a pulse on lead 256, which goes to logic 230 and 232. When the register E is greater than register K a pulse on 256 tells the add logic 232 to add 1 to the total in register T, the signal going by lead 236. Whenever the total in register K is greater than the total in register E a signal goes by way of lead 256 to the subtract logic 230, and says subtract 1 from the total in register T. This communication is by lead 234. This action is taken each time there is a pulse on this strobe line 216, which is communicated by leads 222 and 228, to the logic 232 and 230.

The register K is a 32 bit register and the register T is a 16 bit register, and on strobe signal on lead 216, communicated by leads 220 and 218, whatever the total count in register T it is transferred into register K. Since K adds a large number of signals from T, it must have a greater bit capacity, and therefore it is a 32 bit register, whereas the register T is 16 bit. The total in the register 202 has a maximum of 16 bits and this is compared by comparator D with the most significant 16 bits in register K. Therefore, the value of the digital number in the register K is $2^{16}$ times the total in the register E.

Consider the following operation of this circuit. At any instance the value of the number stored in register E is a number of pulses which represent the encoder output corresponding to a given instantaneous value of pressure. What must be done is to take the square root of this number stored in register E. The way this is done is to insert numbers into register T beginning at 1 and then to transfer these numbers into register K. The total in register K will be equal to the sum of all numbers from 1 up to a number T. This addition process goes on as long as the value of the top 16 bits in register K is less than the 16 bits in register E.

Consider that the registers K and T are cleared, and both start at 0. On each strobe cycle of the 300 KHz signal and E is greater than K, the comparator puts out a pulse to add 1 to the register T. There is a bit placed in register T, and at the same time the reading of the total count in register T is transferred to register K. At the rate of the strobe the number sequentially builds up in T, and each time it changes by 1, the total is transferred to K. Thus, the instantaneous reading of register K is equal to the summation of all numbers from 1 up to the current number in T. This continues until the comparator sees the same number on leads 210 as on leads 212, and thereafter it stops putting out the signal to add. On the other hand, if the register E should decrease by the pen moving back towards zero, by the same procedure when E is less than K on each strobe pulse, one unit is subtracted from the register T and the magnitude of the total in register T is substracted from the register K.

If T represents the number in register T, then K, the number in register K is;

$$K = \sum_{1}^{T} t = \frac{T^2}{2}$$

And $$\sum_{1}^{T} t = 2^{16} E,$$

Where E is the number in register E.
Thus
$T^2/2 = 2^{16}E$
$T^2 = 2 \times 2^{16} E$
$T = \sqrt{2 \times 256} \sqrt{E}$
$M\sqrt{E} = M\sqrt{P+A} = T$, the count in register T It is therefore clear that the number of counts in the T register, when the total in the E register equals that in the most significant 16 bits of the K register, represents a constant M times the square root of the total in the E register, which is either $M\sqrt{P+A}$ or $M\sqrt{H}$ It will be recalled that the reading of the pen on the chart represents gauge pressure which is the amount of pressure above the value of atmospheric pressure. However, the computation of flow depends on the square root of the absolute pressure which is the gauge pressure plus atmospheric pressure. Consequently to the pulses put out by the encoder, there must be added another group of pulses representative of the value of atmospheric pressure scaled to the scale of pulses representing pressure. This is indicated schematically in FIG. 4 by the box 231, which represents atmospheric pressure PA, which is a box for inserting into register E, at the start, a series of pulses which represent atmospheric pressure. Thereafter, the total in the register E is incremented up or down by means of the logic boxes 248 and 250.

These logic boxes 248 and 250 as well as 230 and 232 are simply gating circuits, which are common, and well-known in the art, whereby the signal on the input is passed on to the output by means of enabling pulse on the strobe line 216.

The total accumulated in the T register therefore represents a constant times the square root of the total in the register E which represents (P + A) or absolute pressure H. This total in register T is transferred to box 130 of FIG. 3. A similar circuit to that of FIG. 4, which is used to provide the square root of the differential pressure H, as represented by the encoder on the differential pen, provides a similar and equivalent total count on a register T' which represents square root of the differential pressure. These two numbers are then multipled together in a digital multiplier in the box 130.

There are many ways of doing digital multiplication which have been developed over the years and are well-known to a man skilled in the arts. Many of these systems for multiplication of digital numbers are discussed in great detail in textbooks. One such textbook, which is very appropriate to this problem, is entitled *Decimal Computation*, by Hermann Schmid, published by John Witey & Sons, New York, 1974. No further detail is required for the multiplier of box 130 in view of the great detail shown for various types of digital multipliers.

The signal on lead 152 of FIG. 3 carries the pulses which are provided by the pulsing wheel 32 and photocell 38 of FIG. 1. Thus, at each interval of time represented on the chart of FIG. 1, there is a calculation of multiplication of the square root of (P + A) and the square root of H, the product representing a value of flow of fluid. This is then put into an accumulator, or adder, which totals the flow value at each of the 1,000 time intervals along the chart. After a complete revolution of the chart, the value of the digital number in the accumulator representing the totalized daily flow can be converted from digital to binary-coded-decimal code, and this number, by means of lead 136 can be displayed on register 138 and display 156, or it can be sent to the printer 142, and printed on paper 146. The display and the printing can be done on each impulse on lead 152, or can be done at the end of the complete calculation.

Referring for a moment to the box 72 of FIG. 1, the number represented in this register is the total flow and corresponds to the box marked 156 of FIG. 3.

The signals from the pulser wheel 32 can be sent to a counter, or register, the total of which can be displayed and can be converted to binary-coded-decimal code and displayed on the register 76. This series of pulses represents the time along the charts.

The count in the register E at each pulse of wheel 32, is integrated over the period of time for a full revolution of the chart 24. This is divided by the amount of time, or total number of impulses, to derive an average value of pressure, which is converted to decimal code and displayed in register 74.

In FIG. 3 there is shown an accumulator 162 which can be used to accumulate the total flow for more than a single chart. The accumulator in box 130 integrates the total flow for a single chart. However, if there are a group of charts, representing a group of wells, for example in a single lease, and it is desired to find out what the total flow is from that lease, then as the series of charts are mounted on the integrator table, the accumulator 162 can keep track of the total of each of the several charts.

Summarizing, there are two optical encoders, each of which goes to a pulse shaper and decoding logic. Each decoding logic has two output lines, one for up counts and another for down counts. Each of the four outputs go to appropriate scaling units, and then to buffers, such as 240, 242 of FIG. 4. There are two square root extractors similar to FIG. 4, one for (P + A) and the other for H. The square root outputs of each extractor go to a multiplier, and the product goes to a binary accumulator, the output of which is converted to decimal code and displayed and/or recorded. The integrated flow for several charts can be separately accumulated and displayed.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

We claim:

1. An integrator for transcribing circular chart records of pressure (P) and differential pressure (H) and calculating the integral of instantaneous flow rate to provide a value of total flow, comprising:
   a. chart drive means including means to provide pulses at selected incremental angles of rotation of said chart;
   b. two rotatable pen arms, one for tracking the trace of P, and the other for tracking the trace of H, on said chart, manual operating arms for rotating said pen arms, and means separately to digitally encode the angles of rotation of said pen arms;
   c. means to convert the output of said digital encoders to digital numbers representative of the instantaneous values of (P + A) and H, where A is a measure of atmospheric pressure;
   d. means to extract the square roots of said digital numbers to obtain digital values of $\sqrt{(P+A)}$ and $\sqrt{H}$; and
   e. means to multiply $\sqrt{(P+A)}$ times $\sqrt{H}$;
   and means to accumulate the product thereof through a selected angle of said chart.

2. The integrator as in claim 1 including means to convert the digital words representing flow to decimal words, and means to display said decimal words.

3. The integrator as in claim 2 including means to record said decimal words.

4. The integrator as in claim 1 including means to multiply the digital pulses from said pen arm encoders by a selected scaling factor.

5. The integrator as in claim 1 in which said chart drive means comprises a rotatable plate on which said chart is mounted, means to rotate said plate at a selected rate, and means to generate electrical pulses at each incremental angle of rotation.

6. The integrator as in claim 1 in which said digital encoder comprises a first linear grid of equal width, lines and spaces, a second linear grid parallel to said first grid, said second grid spaced longitudinally from said first grid by one half the width of a line, a third grid of lines and spaces of the same width and overlying both said first and second grid, said third grid in the form of a circle rotatable in fixed relation to said pen arms, and first and second aperture means, light source and photodetector means respectively over said first and said second grids, whereby the outputs of said first and second photodetectors are proportional to the light passing through said first and third grids, and said second and third grids respectively.

7. The integrator as in claim 6 including means to pulse shape and decode the shaped pulses from said digital encoder, and to provide a first train of pulses as said encoder rotates toward larger angles, and a second train of pulses as said encoder rotates toward smaller angles, and including up/down counter means to add said first train of pulses and subtract said second train of pulses.

8. The integrator as in claim 1 in which said means to extract said square roots comprises:
   a. first register means to accumulate first digital pulses to obtain a first digital number;
   b. second register means to accumulate second digital pulses to obtain a second digital number;
   c. third register means to successively accumulate the digital numbers in said second register at selected intervals, and to provide a third digital number;
   d. comparison means to compare said first digital number and said third digital number times $2^{16}$; and
   e. means responsive to said comparison means to add or subtract pulses to or from said second digital number;

whereby said second digital number is proportional to the square root of said first digital number.

* * * * *